United States Patent [19]

Suzuki et al.

[11] 4,181,938

[45] Jan. 1, 1980

[54] PROCESSOR DEVICE

[75] Inventors: Seigo Suzuki, Yokohama; Seiji Eguchi, Kawasaki, both of Japan

[73] Assignee: Tokyo Shibaura Electric Co., Ltd., Japan

[21] Appl. No.: 849,989

[22] Filed: Nov. 9, 1977

Related U.S. Application Data

[63] Continuation-in-part of Ser. No. 732,760, Oct. 15, 1976, abandoned.

[30] Foreign Application Priority Data

Oct. 15, 1975 [JP] Japan ................................ 50-124152

[51] Int. Cl.² .............................................. G06F 13/00
[52] U.S. Cl. ............................ 364/200; 364/900
[58] Field of Search ... 364/200 MS File, 900 MS File

[56] References Cited

U.S. PATENT DOCUMENTS

| | | | |
|---|---|---|---|
| 4,007,448 | 2/1977 | Sergeant et al. | 364/200 |
| 4,010,449 | 3/1977 | Faggin et al. | 364/200 |
| 4,038,644 | 7/1977 | Duke et al. | 364/900 |
| 4,040,028 | 8/1977 | Pauker et al. | 364/200 |
| 4,067,059 | 1/1978 | Derchak | 364/200 |
| 4,087,854 | 5/1978 | Kinoshita et al. | 364/200 |

*Primary Examiner*—Gareth D. Shaw
*Assistant Examiner*—C. T. Bartz
*Attorney, Agent, or Firm*—Finnegan, Henderson, Farabow & Garrett

[57] ABSTRACT

A processor device which comprises a processor unit integrated in a single chip and integrally assembled with a programming system, thereby providing a direct memory access-controlling function for carrying out a direct memory access between a main memory and an input-output device, and a cycle steal-controlling function for selecting a program mode or direct memory access mode.

8 Claims, 3 Drawing Figures

F I G. 1
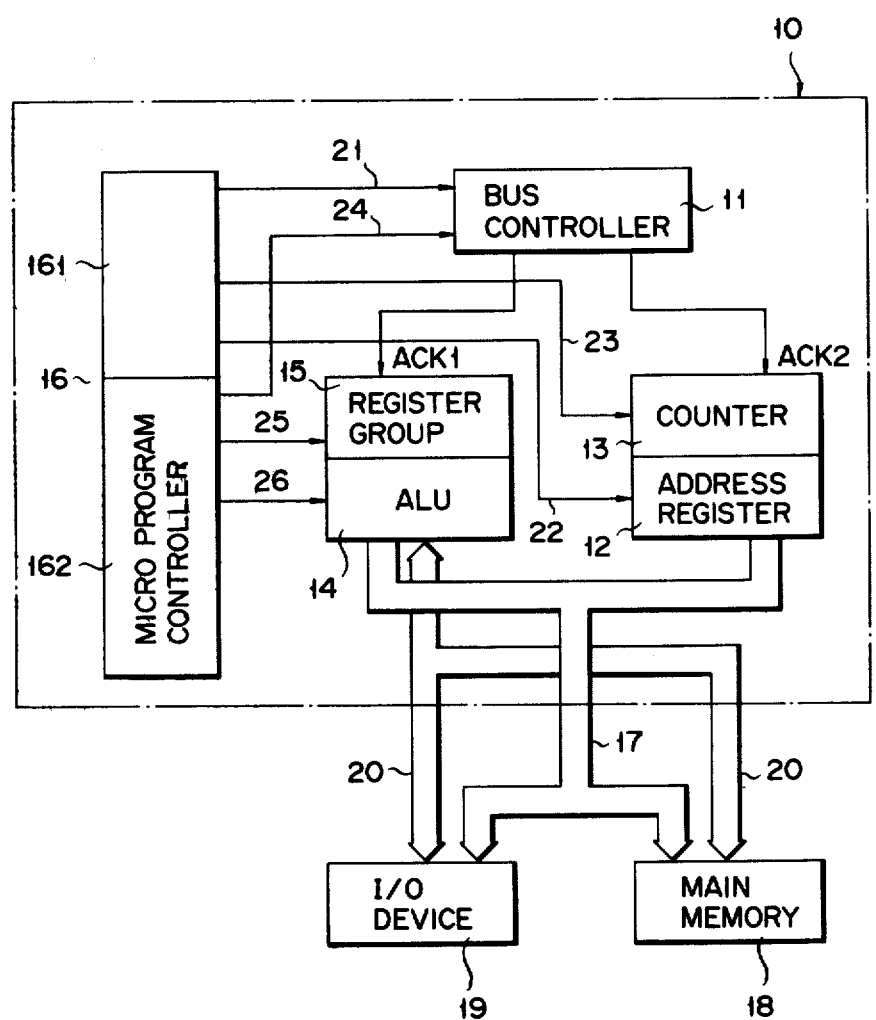

F I G. 2
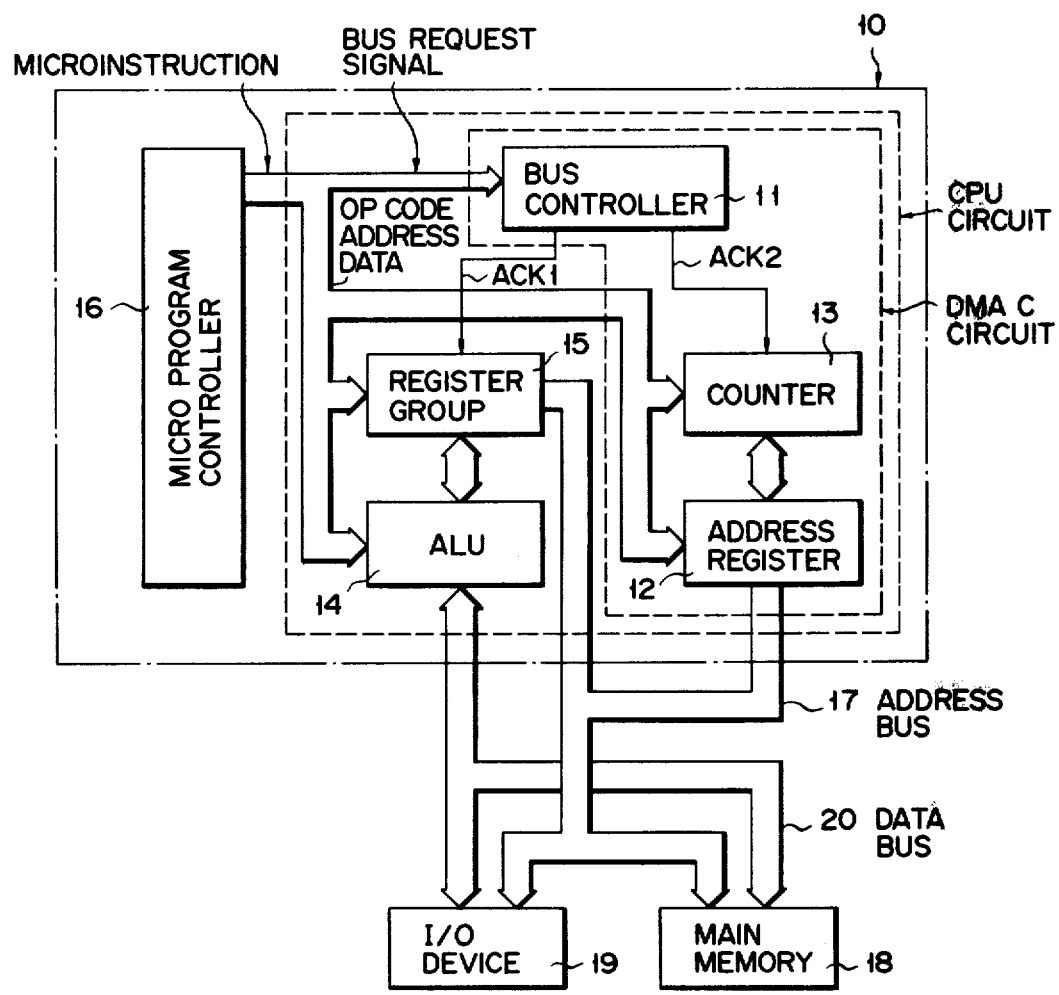
F I G. 3
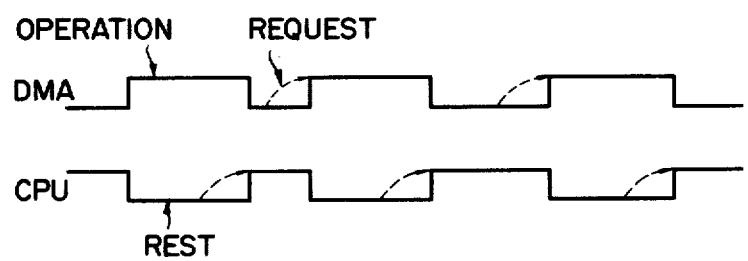

PROCESSOR DEVICE

PARENT APPLICATION

This application is a continuation-in-part of U.S. application Ser. No. 732,760, entitled "A Processor Device", filed Oct. 15, 1976, now abandoned

BACKGROUND OF THE INVENTION

This invention relates to the arrangement of a microprocessor provided with a direct memory access system for use with a microcomputer.

recently with a data-processing system, a microprocessor integrated in a single chip (hereinafter referred to as "a processor" or "CPU") has been widely accepted due to development of a semiconductor-manufacturing technique. As a result, a great variety of quickly operative input-output (hereinafter abbreviated as "I/O devices") have been developed for use with the data-processing system. Where the I/O device is operated at a higher speed than the processor, data transfer between the I/O device and main memory through the processor is carried out inefficiently. To eliminate this drawback, therefore, a direct memory access (hereinafter abbreviated as "DMA") system is adopted. This DMA system enables data to be transferred directly between the main memory and I/O device, offering the advantages of decreasing a load on the processor, accelerating transfer of data and carrying out efficient processing of data. The DMA transfer is effected by means of a direct memory access controller (hereinafter abbreviated as "DMAC") integrated in a separate chip from that in which the processor is formed. However, the DMAC exclusively uses the main memory and memory bus while carrying out the DMA transfer. During such time, the processor (CPU) which shares the main memory and memory bus with the DMAC has to be temporarily prevented from being actuated.

Operation of the CPU and DMAC is controlled by either of the following two systems. According to one control system, the DMA transfer precedes data transfer between the processor and main memory. The DMA transfer memorizes the entire memory cycle. The processor is allowed to use the main memory and common memory bus only when the DMA transfer is stopped or the I/O device issues a "busy" signal, showing that the I/O device is not ready for data transfer and that the DMA transfer is suspended. Another control system is a sort of cycle steal process by which current DMA transfer is temporarily interrupted by a memory access through the CPU which is undertaken by utilizing a memory cycle corresponding to an interval between the operations of the memory bus. The first control system enables data transfer and the CPU to be controlled relatively easily. For example, if a flag is provided to indicate that the DMA transfer is being carried on or said data transfer is terminated or temporarily suspended, then it is easy to control the operation of the CPU. With the first control system, once DMA transfer is commenced, data transfer between the CPU and main memory is brought to an end, reducing the efficiency of processing a program.

The second control system gives improved program-processing efficiency, but has the drawback that timing loss results, unless a memory cycle is properly apportioned to realize an efficient memory bus operation relative to the CPU and DMAC. Where a memory access through the CPU and that by the DMAC are carried out alternately (cycle steal), time loss arises before and after the changeover of the memory bus operation is confirmed. Consequently, the efficiency of processing a program becomes lower than in the first control system.

With the second control system, either the CPU or the DMAC which are integrated in separate chips makes a request to use the common memory bus, after the exclusive use of said memory bus by the other element is brought to an end, and is provented from said exclusive use until the aforesaid request is permitted (that is, during "a request period"). Therefore, data transfer through the CPU or by the DMAC does not take place during the request period. This request period, which itself is a time loss, is further added to a time loss resulting from the changeover of the operation of the common memory bus, thereby leading to a significant decrease in the length of time actually allowed for data transfer either through the CPU or by the DMAC and, consequently, a decline in the program-processing efficiency.

A further disadvantage of the second control system is that it is necessary to form an external device such as a memory bus controller in still another chip in order to effect the smooth changeover of the memory bus operation between the CPU and DMAC. Provision of the CPU, DMAC and memory bus controller exceedingly complicates the hardware arrangement.

SUMMARY OF THE INVENTION

It is accordingly an object of this invention to provide a processor device which is improved in the utilization of a common memory bus and, consequently, in the efficiency of processing a program.

Another object of this invention is to provide a processor device whose hardware arrangement has been considerably simplified.

According to an aspect of the invention, there is provided a processor device in which a DMAC circuit for effecting DMA transfer between a main memory and I/O device and a selection circuit for selecting a program mode or DMA mode are all integrated in the same chip as that in which the processor unit is formed.

BRIEF DESCRIPTION OF THE DRAWINGS

FIG. 1 is a block circuit diagram of a processor device embodying this invention;

FIG. 2 is a block circuit diagram illustrating a second embodiment of the invention; and FIG. 3 shows waveforms, illustrating the operation of the processor device of the invention.

DETAILED DESCRIPTION OF THE PREFERRED EMBODIMENT

There will now be described by reference to the appended drawings the operation of a processor device embodying this invention.

Referring to FIG. 1, referential numeral 10 shows a processor unit integrated in a single chip.

The processor unit 10 includes (1) a DMAC circuit exclusively utilizing a common memory bus timewise to permit the execution of a DMA mode for gaining access to a memory device, (2) a CPU circuit exclusively utilizing the common bus timewise to permit the operation of a program mode for gaining access to a program stored in a memory 18, and (3) a microprogram controller 16 connected between the DMAC circuit and the CPU circuit for storing a microprogram to control operations between the DMAC circuit and the CPU circuit.

The DMAC circuit section includes (1) a bus controller 11 for effecting a changeover between the DMA mode and the program mode relative to the exclusive use of the common memory bus, (2) a counter 13 connected to the bus controller to effect an address step upon receipt of a control signal from the microprogram controller 16, and (3) an address register 12 connected to the counter 13 and adapted to store address data.

The CPU circuit section includes (1) a register group 15 connected to the corresponding output of the bus controller 11 to store data necessary for calculation and including, by way of example only, a command register, data register and location register of well-known design, and (2) an arithmetic logic unit (ALU) 14 connected to the register group 15 to execute an arithmetic logic operation based on predetermined data.

The processor unit 10 is further designed to function as the CPU through the DMAC circuit, as will be shown hereinafter with reference to FIG. 2.

The microprogram controller 16 includes a portion 161 for storing a microprogram for controlling the DMAC circuit, and a portion 162 for storing a microprogram for controlling the CPU circuit. The portion 161 supplies a bus request signal 21, requesting an execution of the DMA mode, to the bus controller 11, a signal 22 for setting a start address upon execution of the DMA mode to the address register 12, and a signal 23 for effecting an address step (+1 or −1) to the counter 13. The portion 162 supplies a bus request signal 24 for requesting an execution of a program mode to the bus controller 11, a command signal 25 for executing the program mode and its corresponding data to the register group 15, and a signal 26 for designating the function of an arithmetic logic operation to ALU 14.

In this embodiment the microprogram controller 16 includes the two portions 161 and 162 for ease in explaining the DMA mode and program mode. The microprogram controller can alternatively be constructed using one microprogram for controlling both the DMA mode and program mode in sequence, as will be explained hereinafter with reference to FIG. 2.

The DMAC may be considered concurrently to undertake the selection of the DMAC or CPU relative to the exclusive use of the common memory bus. An address bus 17 is shared by the CPU and DMAC in accordance with the microprogram read out from the microprogram controller 16. It is to be noted that the common memory bus includes the address bus 17 and the data bus 20.

With the embodiment of this invention, a program mode based on the CPU and a DMA mode based on the DMAC are effected within a single chip. The DMAC circuit formed of the common memory bus controller 11, address register 12 and counter 13 is concurrently used as a CPU circuit in the case of the program mode. Further, a memory cycle is so apportioned within the same chip as to operate the common memory bus for the DMA mode or program mode in unit timing states in order to avoid time loss, thereby realizing a very efficient memory cycle apportionment for use of the common memory bus, particularly, for an effective control of a cycle steal.

The "cycle steal" is a well-known technique in the computer field. In a cycle steal, the DMAC effects a data transfer between the main memory 18 and the I/O device 19, independently of CPU control, by utilizing the idle portion of an operation cycle of the program mode. A cycle steal command circuit includes the microprogram controller 16 for storing a microprogram and the bus controller 11 for controlling the use of the common memory bus. The "User Manual For The COSMAC Microprocessor" by RCA Corporation (May 1975) references the well-known cycle steal at pages 39 to 43.

With the processor device of this invention, judgment of whether a succeeding memory access is based on the DMA mode or program mode is made by a request for the exclusive use of the common memory bus which arises within the same chip.

Further, the common memory bus controller 11 controls the selection of the DMA mode or program mode. That is, the bus controller 11 judges the presence of the bus request dependent upon the level of one bit of an instruction word stored in the microprogram controller 16. The bus controller 11 receives, for example, a bus request signal 21 from the portion 161 of the microprogram controller 16 and supplies to the DMAC circuit a permit signal ACK1 for permitting the exclusive use of the common memory bus (17,20) by the DMAC circuit, since it executes a DMA mode operation cycle immediately upon completion of the program mode operation cycle. A microinstruction consisting of a microprogram is sequentially executed.

Where the microinstruction is a program mode instruction for having access to the external memory 18, the bus request from the portion 162 is supplied to the bus controller 11. The bus controller 11 imparts to the CPU circuit (register group) a permit signal ACK2 for permitting the CPU circuit to exclusively use the address bus 17. Address data 25 to be read from the portion 162 is supplied to the register group 15. The address data exclusively occupies the address bus 17 and is supplied through ALU 14 to the main memory 18. Consequently, the data from the address-designated main memory 18 is supplied through the data bus 20 to the CPU circuit (ALU in FIG. 1).

Where a next subsequent microinstruction from the portion 162 is an internal instruction (such as an arithmetic logic instruction), as opposed to an instruction for gaining access to the external memory, the common bus 17 has an available idle space and consequently the DMAC circuit exclusively occupies the common bus and can execute the DMA mode. According to this invention, this object is attained by the microprogram of the portion 161. A bus request bit in the microinstruction word of the portion 161 represents, for example, a "1" level. The bus controller 11 receives a bus request signal 21 from the portion 161 and supplies to the DMAC circuit (counter 13 in FIG. 1) a permit signal ACK1 for permitting the use of the address bus 20. The address of the memory device 18 is set by the signal 22 from the portion 161 to the address register. Consequently, the DMAC circuit exclusively occupies the common address bus 17 and supplies an address data stored in the address register 12 to the address register 12 to designate the address of the main memory 18. Then, the address data is transferred from the memory 18 through the data bus 20 to the I/O device, or vice versa. At this time, the counter 13 has its contents counted up in increments of "+1" and the output of the counter 13 sequentially stores the address register 12.

Therefore, a memory cycle lying between a command fetch and operand fetch in the case of, for example, a program mode can be interrupted very easily and efficiently by a DMA operation for a certain number of steps. A memory cycle apportionment for the selective use of the common memory bus or the selection of the DMA mode or program mode is carried out in the same chip as that in which the CPU circuit is formed, making it unnecessary to provide any external circuit for controlling the selective use of the common memory bus.

Further, as previously described, the selective use of the common memory bus is controlled in unit timing states within the same chip, eliminating the necessity of providing any software for controlling said selective use. With the processor device of this invention, the operation of detecting the DMA mode or program mode and changing over the operation of the common memory bus in response to said detection is carried out with ease and eliminates the necessity of providing any external circuit, thereby noticeably decreasing time loss which might otherwise occur in the changeover of the operation of the common memory bus. Where the common memory bus controller 11 provided in the processor 10 formed in a single chip is of the nonsynchronizing type, then the apportionment of a memory cycle can be controlled at a delayed logic level, enabling the operation of the common memory bus to be changed over efficiently.

In the FIG. 2 embodiment of the invention, like numerals indicate elements of the invention previously described.

In the processor device, shown in FIG. 2, the CPU and DMAC circuits are formed integrally on a single chip. The DMAC circuit is constituted by a part of the CPU circuit as shown by the solid and dotted lines in FIG. 2. For this reason the processor device has a simple construction. A program for executing CPU (program) mode and a program for executing DMAC mode are combined to form a single microprogram, which is stored in the program controller 16. The microprogram consists of various microinstructions such as a read-and-write instruction, an arithmetic logical instruction and an input/output instruction of well-known nature in the art. These microinstructions are of CPU mode. The read-and-write microinstruction may be of DMAC mode. Each microinstruction consists of, for example, a bus-request field, an operation code field and an operand field. The operand field of each microinstruction contains an address or data.

The microinstructions are read out from the microprogram controller 16 one after another. If the data in the bus-request field of a microinstruction is of CPU mode, the bus controller 11 supplies an acknowledgement signal ACK1 to the register group 15 of the CPU circuit, and the operation code in the operation code field and the address or data in the operand field are transferred to the register group 15 and ALU 14 of the CPU circuit, respectively. If the data in the bus-request field of a mocroinstruction is of DMAC mode, the bus controller 11 supplies an acknowledgement signal ACK2 to the counter 13 of the DMAC circuit, and the operation code in the operation code field and the operation code field and the address or data in the operand field are transferred to the counter 13 and address register 12 of the DMAC circuit, respectively. In short, the circuit elements 12 to 15 operate when the microinstruction from the microprogram controller 16 is of CPU mode, while the circuit elements 12 and 13 operate when the microinstruction is of DMAC mode.

The operation of the embodiment shown in FIG. 2 otherwise operates in the same manner as described with respect to FIG. 1.

FIG. 3 shows the waveforms illustrating the manner in which the common memory bus is selectively used. With the aforesaid second control system of the prior art, a request signal for a program mode following a DMA mode was issued after the DMA transfer was completed. Accordingly, a length of time required for the program mode operation was reduced by the request period.

According to the instant invention, however, a request signal for a program mode operation is sent forth before a memory access based on the DMA mode is brought to an end (before a timing for the termination of the temporary use of the common memory bus passes). A request for the succeeding program mode operation is quickly treated in the same chip during the rest of the CPU, thus realizing commencement of the program mode (CPU) operation, as soon as the DMA transfer is finished, and in consequence significantly decreasing time loss resulting from the issue of the aforesaid request signal for the changeover of the operation of the common memory bus. The efficiency of utilizing the common memory bus in the embodiment of this invention accounts for about 90% as against 40 to 50% attained by the second control system of the prior art, proving that the processor device of the invention displays a far more prominent effect than the conventional type.

Further with respect to the embodiments of FIGS. 1 and 2, the DMAC, CPU and a circuit for changing over the operation of a common memory bus between the DMA mode and program mode are integrated in the same chip, making possible the concurrent use of any of these three elements, and moreover decreasing a total required number of chips with the resultant simplification of the arrangement of the entire processor device.

As mentioned above, the processor device of this invention, in which the DMAC, CPU, a circuit for effecting a changeover between both elements and an accompanying cycle steal controlling circuit are all integrated in a single chip, improves the efficiency of utilizing a common memory bus, and reduces the load on the hardware.

What we claim is:

1. A processor device comprising a direct memory access controller utilizing a common memory bus for executing an operation of a direct memory access mode for gaining access to a main memory, a central processing unit utilizing said common memory bus for executing an operation of a microprogram-executing mode for gaining access to microprogram data stored in the main memory, and a microprogram controller connected to said direct memory access controller and said central processing unit for storing microprogram data to control the operation of the direct memory access controller and the central processing unit so that the microprogram controller will instruct the direct memory access controller and the central processing unit with respect to the execution of the operation of the direct memory access mode and microprogram-executing mode, the direct memory access controller, central processing unit and microprogram controller being integrated in a single semiconductor chip.

2. The processor device according to claim 1, wherein the direct memory access controller is provided with means for effecting a changeover between the direct memory access mode and microprogram-executing mode relative to the exclusive use of the common memory bus.

3. The processor device according to claim 2, wherein said changeover means comprises a bus controller.

4. The processor device according to claim 1, wherein the direct memory access controller includes a cycle steal controlling means relative to the main memory.

5. The processor device according to claim 4, wherein said cycle steal controlling means includes a microprogram portion for storing microprogram data and a bus controller for controlling the exclusive use of the common memory bus connected to the main memory, wherein, when the bus controller receives a bus request signal from the microprogram portin, a common memory bus available permit signal is given to the direct memory access controller whereby the direct memory access controller executes access to the main memory utilizing an idle time of the common memory bus unoccupied by the central processing unit.

6. The processor device according to claim 1, wherein said microprogram controller includes means for storing sequence microprogram data for controlling the direct memory access controller and central processing unit, means for supplying bus request signals corresponding to the direct memory access mode and microprogram-executing mode according to the microprogram to the bus controller for controlling the common bus, and means for generating the request signal before a need for the direct memory access mode arises.

7. A processor device comprising a direct memory access controller utilizing a common memory bus for executing an operation of a direct memory access mode for gaining access to a main memory and including a bus controller for effecting a changeover between a direct memory access mode and microprogram-executing mode relative to the exclusive use of the common memory bus, a counter connected to an output terminal of the bus controller to effect an address step and an address register connected to the counter to store address data, a central processing unit utilizing said common memory bus for executing an operation of a microprogram-executing mode for gaining access to microprogram data stored in the main memory and including a register group connected to an output terminal of the bus controller to store address data for calculation and an arithmetic logic unit connected to said register group for executing an arithmetic logic operation based on predetermined data, and a microprogram controller connected to the direct memory access controller and central processing unit for storing microprogram data to control the direct memory access controller and control processing unit so that the microprogram controller will instruct the direct memory access controller and the central processing unit with respect to the execution of the operation of the direct memory access mode and microprogram-executing mode.

8. The processor device according to claim 7, wherein said direct memory access controller, said central processing unit, and said microprogram controller are integrated in a single chip.

* * * * *